United States Patent [19]

Schreiber

[11] 4,075,792
[45] Feb. 28, 1978

[54] SYSTEM FOR CONTROLLING THE ADVANCE OF A ROTARY MACHINE TOOL

[75] Inventor: Jürgen Schreiber, Wetzlar, Germany

[73] Assignee: Buderus'sche Eisenwerke Aktiengesellschaft, Wetzlar, Germany

[21] Appl. No.: 677,121

[22] Filed: Apr. 15, 1976

[30] Foreign Application Priority Data

Apr. 17, 1975 Germany .............. 2517001

[51] Int. Cl.² .............................. B24B 47/06
[52] U.S. Cl. .................... 51/165.92; 51/99
[58] Field of Search .......... 51/165 R, 165.77, 165.92, 51/135 R, 99

[56] References Cited

U.S. PATENT DOCUMENTS

| | | | |
|---|---|---|---|
| 2,961,808 | 11/1960 | Dunigan | 51/165.92 |
| 3,524,285 | 8/1970 | Rutt | 51/135 R |
| 3,589,077 | 6/1971 | Lenning | 51/165.92 |
| 3,656,261 | 4/1972 | Everett | 51/99 |
| 3,859,755 | 6/1975 | Schaller | 51/165.92 |

FOREIGN PATENT DOCUMENTS 782,432  9/1957  United Kingdom .............. 51/165.92

Primary Examiner—Harold D. Whitehead
Attorney, Agent, or Firm—Karl F. Ross

[57] ABSTRACT

A rotary machine tool, such as a grinding wheel, is mounted on a movable support serving to advance the tool toward a workpiece, such as a pipe to be severed thereby. The tool is driven by an electric motor whose operating current is measured by a sensor controlling the fluid supply to a hydraulic servomotor which is linked with the support. When the advance is too rapid, the resulting rise in load resistance increases the operating current and causes a throttling of the fluid pressure, the rate of advance being thus optimized in conformity with the shape and/or composition of the workpiece.

2 Claims, 1 Drawing Figure

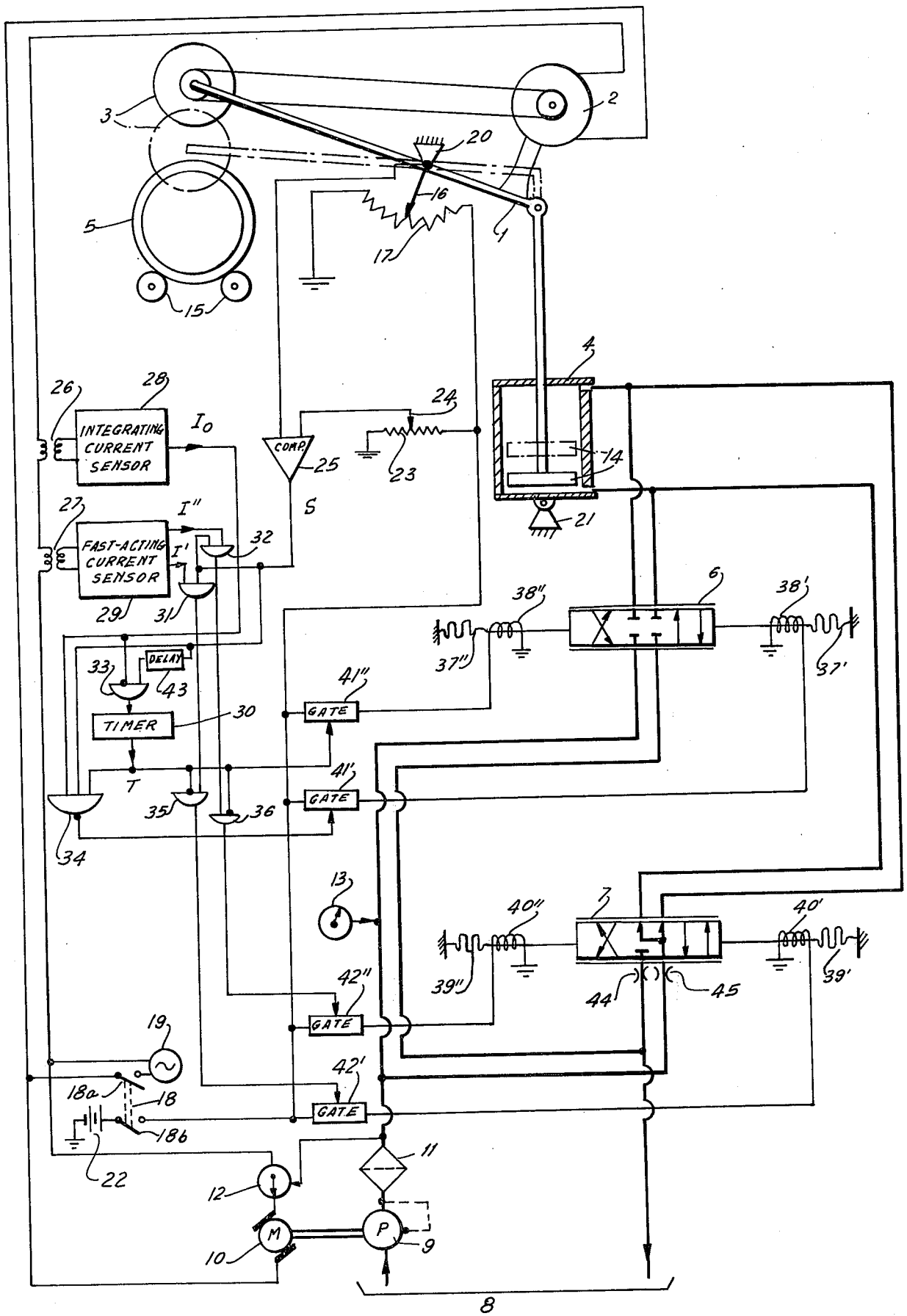

SYSTEM FOR CONTROLLING THE ADVANCE OF A ROTARY MACHINE TOOL

FIELD OF THE INVENTION

My present invention relates to a system for controlling the advance of a rotary machine tool, such as a grinding wheel, toward a workpiece.

BACKGROUND OF THE INVENTION

If a grinding wheel, for example, is used for cutting peripheral grooves into a pipe or other generally cylindrical workpiece rotatable on a suitable holder, or if the workpiece is to be severed by such a tool, a hydraulically or otherwise actuated tool support may be rapidly displaced to advance the tool from a withdrawn position into a workpiece-engaging position, the advance being then continued at a reduced rate which in conventional systems is preselected to take into account not only the composition and the wall thickness of the workpiece but also any possible eccentricity thereof to cause variations of the depth of penetration of the tool as the workpiece rotates about its axis. In order to prevent overheating and possible stoppage, especially at points where the tool first encounters the workpiece, that preselected rate of advance must be slower than is necessary at other points where the workpiece is thinner, softer or farther away from the starting position of the tool.

OBJECTS OF THE INVENTION

An object of my present invention, therefore, is to provide an improved system for controlling the advance of such a rotary tool in a manner increasing the average rate of advance to an optimum level, consistent with the available driving power, so as to speed up the machining operation and to produce a clean cut.

A related object is to provide a system for carrying out this operation in an efficient way, especially where the tool support is movable with the aid of a fluidically actuated servomotor.

SUMMARY OF THE INVENTION

In accordance with my present invention, the rotary speed of the tool is continuously monitored and changes in that speed, detected by the monitoring means, are used to vary the rate of advance in a generally inverse relationship with that rotary speed. This is done by continuously sensing the operating current of a drive motor for the rotary tool and the rate of advance of the tool during a working phase is varied in such a manner as to maintain that current substantially constant.

For this purpose, pursuant to my invention, I provide current-sensing means in circuit with the electric drive means for the rotary tool and control means responsive thereto for varying the rate of displacement of the tool support, in the manner set forth above, by actuating a hydraulic servomotor, linked with that support, through a high-rate fluid-supply circuit under low-current conditions (i.e. in an approach phase) and through a low-rate fluid-supply circuit under high-current conditions (i.e. in the working phase). With the aid of suitably set switchover means, the high-rate fluid-supply dircuit can be re-established in a withdrawal phase for a rapid retraction of the tool to its starting position upon a recurrence of the initial low-current conditions due to severance of the workpiece; for this purpose, of course, the servomotor will have to be reversible.

In such a case the variation in the rate of advance under the control of the operating current of the tool motor may include a halting or even a reversal of the advance as the motor current exceeds a certain threshold. The fluid-supply circuits of the hydraulic servomotor linked with the tool support may then include two three-position valves in parallel, i.e. a selectively settable main valve and a sensor-controlled ancillary valve.

Although my invention is primarily intended for use with grinding wheels, other rotary machine tools such as circular saws or millers could be controlled in an analogous fashion, e.g. with workpieces that are positively driven about an axis parallel to the axis of tool rotation (transverse to the direction of advance). In the case of a grinding wheel, the wheel itself causes the workpiece to rotate if the latter is supported on a holder permitting such rotation, e.g. on a pair of parallel rollers.

BRIEF DESCRIPTION OF THE DRAWING

The above and other features of my invention will now be described in detail with reference to the accompanying drawing. the sole FIGURE of which is a diagrammatic view of a control system for a grinding wheel embodying my invention.

SPECIFIC DESCRIPTION

The system shown in the drawing comprises a support 1 for a rotary machine tool 3, specifically a grinding wheel which is driven by an electric motor 2 mounted on the same support 1. The latter is a balanced lever with a fixed fulcrum at 20, an end of the lever remote from the axis of grinding wheel 3 being articulated to the rod of a piston 14 of a hydraulic servomotor comprising a cylinder 4 which is pivoted at 21. Grinding wheel 3 overhangs a workpiece 5 in the shape of a pipe which is to be cut in two by the tool, the pipe 5 resting on a pair of parallel idler rollers 15 permitting it to rotate freely about its own axis which parallels the axis of tool 3 and is perpendicular to the swing plane of lever 1.

Servomotor 4, 14 is actuated by a fluid-supply circuit including a conventional pump 9, preferably of the axial-piston type, provided with the usual bypass for recirculating excess fluid. Pump 9 draws oil from a sump 8 and feeds it in parallel to a pair of solenoid-operated three-position valves, namely a main valve 6 and an ancillary valve 7, via an oil filter 11. The pump, whose pressure can be read on a manometer 13, is driven by a motor 10 whose energizing circuit, including a power supply 19 in series with a contact 18a of a master switch 18, contains a pressure switch 12 which communicates with the outlet port of the pump and opens the motor circuit in the event of excess pressure.

Lever 1 carries a slider 16 of a potentiometer 17 which, in operation, is connected across a battery 22 via another contact 18b of master switch 18. D-c source 22 also feeds another potentiometer 23 whose slider 24 is manually presettable to a position in which the voltages of sliders 16 and 24 are equal at a point in the swing of lever 1 where the tool 3 almost touches the workpiece 5. This point can be periodically reset by a manual or automatic shifting of slider 24 to take the progressive shrinkage of the diameter of grinding wheel 3 into account. The two sliders are connected to respective inputs of a comparator 25 which emits a signal S as long as the potential of slider 16 equals or exceeds that of slider 22, thus when the tool 3 is in working position.

The energizing circuit of tool motor 2, extending to a-c supply 19 via switch contact 18a, includes the primaries of a pair of current transformers 26, 27 whose secondaries work into an integrating (i.e. slow-acting) current sensor 28 and a fast-acting (i.e. nonintegrating) current sensor 29, respectively. Sensor 28 monitors the torque of motor 2 and emits a signal $I_o$ as soon as the motor current reaches a predetermined threshold, e.g. of 5 amps, indicative of incipient engagement of tool 3 with workpiece 5. Sensor 28 may have a time constant of several seconds, for example, to discriminate against short-term current fluctuations. Sensor 29 generates, on a first output, a signal I' as long as the motor current is less than a predetermined lower limit well above the threshold of sensor 28, e.g. 15 amps; another output of sensor 29 carries a signal I'' whenever that current exceeds a somewhat higher upper limit, e.g. 20 amps.

Signals I' and I'' are fed to respective AND gates 31 and 32 also receiving the signal S from comparator 25. The latter signal, furthermore, reaches an AND gate 33 through a delay network 43 and a NAND gate 34 without delay; AND goes to gate 33 has an inverting input receiving the signal $I_o$ which is also fed to a noninverting input of NAND gate 34. AND gate 33 works into a starting input of a timer 30, such as a monoflop, which emits a pulse T of a duration sufficient to allow a return swing of lever 1 to its withdrawn position and an emplacement of a new workpiece in the path of tool 3 before the beginning of the next cutting cycle. For semiautomatic operation, timer 30 may be replaced by a self-locking switch such as a thyristor which generates the signal T for an indefinite period, i.e. until manually reset. This signal is applied to a third input of NAND gate 34 and, in parallel therewith, to inverting inputs of two further AND gates 35, 36 with noninverting inputs receiving the outputs S·I' and S·I'' of AND gates 31 and 32, respectively.

The position of valve 6 is controlled by two balancing springs 37', 37'' and two solenoids 38', 38'', the latter being energizable from source 22 via contact 18b through a pair of normally closed gates 41' and 41''. Similarly, the position of valve 7 is controlled by springs 39', 39'' and solenoids 40', 40'', these solenoids being connected to source 22 via contact 18b and a pair of normally closed gates 42', 42''. Unblocking inputs of gates 41', 41'', 42' and 42'' are tied to the outputs of gate 34, timer 30, gate 35 and gate 36, respectively.

In operation, with the tool 3 in its starting position (full lines) remote from workpiece 5, closure of master switch 18 energizes the motors 2 and 10. Since none of the inputs of NAND gate 34 is energized at this time, gate 41' is unblocked and solenoid 38' shifts the body of valve 6 to the right, causing oil under pressure to enter the lower port of cylinder 4 whereby piston 14 is rapidly elevated to advance the tool 3 toward the workpiece 5. As soon as the predetermined approach position has been reached, comparator 25 emits the signal S and blocks the NAND gate 34, thereby closing the gate 41' and de-energizing the solenoid 38'; this restores valve 6 to its normal centered position in which no oil can pass through it to servomotor 4, 14. At the same time, however, the coincidence of signals S and I' opens the AND gate 31 so that AND gate 35 conducts and unblocks the gate 42' to energize the solenoid 40'; this causes a rightward shift of the body of valve 7, which from this point on takes over the control of the tool motion, with continuing advance of the grinding wheel 3 into contact with workpiece 5. The delay period of network 43 is long enough to prevent the tripping of timer 30 in response to signal S until sensor 28 has an output $I_o$ blocking the gate 33.

When the current drawn by motor 2 surpasses its lower limit established by sensor 29, the output signal I' disappears and the consequent recentering of valve 7 feeds oil under pressure to both parts of cylinder 4 in order to hold the lever 1 in a position in which the tool bites into the workpiece. If a drop in the motor current signals the need for a resumption of the advance, solenoid 40' is again energized in the aforedescribed manner; if, on the other hand, the current rises above the upper limit on account of, say, an eccentricity of the workpiece, the appearance of signal I'' in the output of sensor 29 opens the AND gates 32 and 36 to unblock the gate 42'' for the energization of solenoid 40'' whereby the body of valve 7 is moved to the left, allowing oil to enter the upper port of cylinder 4 and lowering the piston 14 until the load has been sufficiently reduced to restore the current to its normal range. Thus, the sensor 29 in combination with valve 7 maintains a substantially constant operating current in the supply circuit of tool motor 2.

After the cutting step has been performed, i.e. with the tool 3 in an advanced position illustrated in dot-dash lines, the load current drops below the threshold of sensor 28 which thereupon terminates the emission of signal $I_o$. AND gate 33 now conducts and starts the timer 30 whose output pulse T keeps the gates 34, 35 and 36 blocked so that gates 41', 42' and 42'' remain cut off. Pulse T unblocks the gate 41'' whereby solenoid 38'' is energized to shift the body of valve 6 to the left, causing a rapid restoration of the tool to its retracted starting position. The cycle can then be repeated.

As symbolically illustrated by throttles 44 and 45, the pressure of the oil traversing the valve 7 is substantially less than that of the oil passing through valve 6 whereby the latter actuates the piston 14 much more rapidly, in the approach and withdrawal phases, than does the valve 7 in the working phase.

I claim:

1. A system for machining a workpiece, comprising:
   a workpiece holder;
   a rotary machine tool engageable with a workpiece on said holder; p1 a support for said tool movable relatively to said holder for advancing said tool toward said workpiece;
   an electric motor coupled with said tool for rotating same about an axis;
   current-sensing means in circuit with said motor;
   a reversible hydraulic servomotor linked with said support and provided with a high-rate fluid-supply circuit including a first valve and with a low-rate fluid-supply circuit including a second valve, each of said valves having a forward-flow position, a neutral position and a reverse-flow position;
   control means responsive to said current-sensing means for placing said first valve in its forward-flow position to advance said tool rapidly toward the workpiece under low-current conditions during an approach phase and for actuating said second valve while maintaining said first valve in its neutral position to displace said tool more slowly under high-current conditions, indicative of an engagement of the tool with the workpiece, at speeds tending to maintain the motor current in a predetermined range during a working phase following said approach phase, with reversal of the flow in said low-rate fluid-supply circuit upon detection of an overload condition by said current-sensing means; and switchover means responsive to a predetermined advance of said tool from a starting position for modifying the operation of said control circuit to hold said second valve in its neutral position while shifting said first valve into its reverse-flow position upon a recurrence of said low-current conditions due to severance of the workpiece for rapidly retracting said tool to said starting position in a withdrawal phase following said working phase.

2. A system as defined in claim 1, wherein said tool is a grinding wheel, said holder comprising a pair of idler roller for supporting said workpiece with freedom of rotation about an axis parallel to said axis.

* * * * *